United States Patent [19]

Piccirilli et al.

[11] Patent Number: 4,468,492

[45] Date of Patent: Aug. 28, 1984

[54] POLYMERIC ORGANO FUNCTIONAL SILANES AS REACTIVE MODIFYING MATERIALS

[75] Inventors: Robert Piccirilli; Wen-Hsuan Chang, both of Gibsonia, Pa.

[73] Assignee: PPG Industries, Inc., Pittsburgh, Pa.

[21] Appl. No.: 514,139

[22] Filed: Jul. 15, 1983

[51] Int. Cl.$^3$ ............................................. C08L 83/00
[52] U.S. Cl. ................................. 525/102; 524/262; 524/267; 524/268; 524/730; 524/731; 525/100; 525/101; 525/479
[58] Field of Search ............... 524/262, 267, 268, 730, 524/731; 525/102, 100, 101, 479

[56] References Cited

U.S. PATENT DOCUMENTS

| | | | |
|---|---|---|---|
| 2,759,007 | 8/1956 | Dunham et al. | 260/448.2 |
| 2,888,439 | 5/1959 | Simons | 260/77.5 |
| 3,032,530 | 5/1962 | Falk | 260/46.5 |
| 3,170,891 | 2/1965 | Speier | 260/37 |
| 3,178,391 | 4/1965 | Holtschmidt et al. | 260/46.5 |
| 3,208,972 | 9/1965 | Lyons | 260/46.5 |
| 3,309,261 | 3/1967 | Schiller et al. | 161/190 |
| 3,318,971 | 5/1967 | Chloupek et al. | 260/826 |
| 3,372,083 | 3/1968 | Evans et al. | 161/190 |
| 3,494,951 | 2/1970 | Berger | 260/448.2 |
| 3,502,704 | 3/1970 | McKellar | 260/448.8 |
| 3,506,734 | 4/1970 | Bedikian | 260/826 |
| 3,539,658 | 11/1970 | Sekmakas et al. | 260/827 |
| 3,556,754 | 1/1971 | Marsden et al. | 65/3 |
| 3,567,499 | 3/1971 | Klebert et al. | 117/139.5 |
| 3,607,901 | 9/1971 | Berger | 260/448.2 N |
| 3,627,722 | 12/1971 | Selter | 260/37 N |
| 3,632,557 | 1/1972 | Brode et al. | 260/77.5 TB |
| 3,632,715 | 1/1972 | Gowdy et al. | 264/136 |
| 3,644,566 | 2/1972 | Kincheloe et al. | 260/826 |
| 3,650,813 | 3/1972 | Nordstrom et al. | 117/93.31 |
| 3,655,602 | 4/1972 | Sekmakas | 260/29.2 M |
| 3,703,499 | 11/1972 | Lindemann | 260/77.5 AT |
| 3,821,218 | 6/1974 | Berger | 260/248 |
| 3,886,226 | 5/1975 | Asai et al. | 260/77.5 AM |
| 3,935,346 | 1/1976 | Stengle et al. | 427/385 |
| 3,979,344 | 9/1976 | Bryant et al. | 260/18 TN |
| 4,031,120 | 6/1977 | Gervase | 260/448.8 R |
| 4,049,867 | 9/1977 | Ito et al. | 428/412 |
| 4,067,844 | 1/1978 | Barron et al. | 260/37 N |
| 4,093,673 | 6/1978 | Chang et al. | 260/824 EP |
| 4,097,643 | 6/1978 | Hasegawa | 428/270 |
| 4,098,840 | 7/1978 | Yoshida et al. | 260/827 |
| 4,122,074 | 10/1978 | Pepe et al. | 526/26 |
| 4,146,585 | 3/1979 | Ward et al. | 260/827 |
| 4,147,685 | 4/1979 | Smith, Jr. | 260/31.2 |
| 4,181,687 | 1/1980 | Ward et al. | 525/100 |
| 4,214,057 | 7/1980 | Ishihara et al. | 525/100 |
| 4,218,498 | 8/1980 | Cohen | 427/336 |
| 4,222,925 | 9/1980 | Bryant et al. | 260/37 N |
| 4,224,211 | 9/1980 | Kanazawa et al. | 260/31.2 R |
| 4,225,650 | 9/1980 | van Brederode et al. | 428/405 |
| 4,243,767 | 1/1981 | Kaufman et al. | 525/102 |
| 4,247,354 | 1/1981 | Ward et al. | 156/329 |
| 4,277,525 | 7/1981 | Nakayama et al. | 427/387 |
| 4,284,548 | 8/1981 | Kaufman et al. | 260/38 |
| 4,291,135 | 9/1981 | Hohlein et al. | 525/101 |
| 4,297,446 | 10/1981 | Lindner et al. | 525/66 |
| 4,308,071 | 12/1981 | Gervase | 106/193 J |
| 4,310,640 | 1/1982 | Kato et al. | 525/100 |
| 4,317,762 | 3/1982 | Kratel et al. | 523/203 |
| 4,330,446 | 5/1982 | Miyosawa et al. | 523/409 |
| 4,345,053 | 8/1982 | Rizk et al. | 525/440 |
| 4,368,294 | 1/1983 | Deubzer et al. | 525/100 |
| 4,369,289 | 1/1983 | Keogh | 525/105 |
| 4,374,237 | 2/1983 | Berger et al. | 528/28 |

FOREIGN PATENT DOCUMENTS 2924632 1/1981 Fed. Rep. of Germany .
136854 10/1981 Japan .

Primary Examiner—Melvyn J. Marquis
Attorney, Agent, or Firm—Linda Pingitore

[57] ABSTRACT

A low temperature curing composition prepared from an essentially silicon-free polymer and a silicon group-containing material is improved by utilizing a silicon group-containing material which is a hydrolyzable organosilicon group-containing polymer which is non-gelled and formed from an essentially silicon-free polymer having isocyanate or active hydrogen functional groups and an organosilicon group-containing material having functional groups reactive with the isocyanate and active hydrogen.

22 Claims, No Drawings

POLYMERIC ORGANO FUNCTIONAL SILANES AS REACTIVE MODIFYING MATERIALS

BACKGROUND OF THE INVENTION

The present invention is directed to compositions prepared from an essentially silicon-free polymer and a modifying material which are useful as refinish coating compositions, particularly as automotive refinish coating compositions.

Quite frequently automobiles are damaged to varying degrees as a result of highway mishaps. When the automobile is extensively damaged it is often necessary to apply a refinish paint in order to properly restore the appearance.

Exemplary of art-recognized automotive refinish compositions are those disclosed in Japanese Kokai Pat. No. Sho 56[1981]-136854 and U.S. Pat. No. 4,310,640 to Kato et al. The Japanese Kokai patent discloses a coating composition which consists of (A) an acrylic resin, (B) an alkoxysilane containing copolymer and (C) cellulose acetate butyrate, all at specified ratios. The alkoxysilane copolymer is obtained by copolymerizing an alkoyxsilane vinyl monomer with vinyl monomers. Kato et al discloses a composition formed from reacting a polymer having terminal allyl groups with a hydrosilyl group-containing material. The reaction proceeds by addition across the double bond. The composition is then combined with an organic amine and/or an alkali metal hydroxide to form an automotive refinish composition.

The automotive refinish compositions which are commonly available are generally formulated for use over the metal portions of an automobile. This can pose considerable difficulty if the elastomeric portions of an automobile are damaged in addition to the metal parts. When an elastomeric part that has been painted with a "metal refinish" composition is bent or otherwise stressed the refinish coating is typically cracked, flaked off, or alternatively the entire coated substrate can shatter.

There is a need therefore for a composition which exhibits not only the requisite adhesion and durability but which is also suitable for coating elastomeric as well as metallic substrates.

SUMMARY OF THE INVENTION

In accordance with the present invention there is provided an improved low temperature curing composition, comprising an essentially silicon-free polymer and a silicon group-containing material, characterized in that the silicon group-containing material is a hydrolyzable, non-gelled organosilicon group-containing polymer formed from reacting:

(a) an essentially silicon-free polymer having functional groups which are selected from isocyanate and active hydrogen; and (b) an organosilicon group-containing material having functional groups reactive with the isocyanate and active hydrogen.

In a preferred embodiment the improved low temperature curing composition comprises a hard, film-forming polymer which has a cured glass transition temperature of greater than 25° C. and a plasticizer. The plasticizer is a hydrolyzable organosilicon group-containing polymer which has a cured glass transition temperature of less than 5° C.; said hydrolyzable organosilicon group-containing polymer being non-gelled and formed from (a) a condensation polymer having terminal functional groups which are selected from isocyanate and active hydrogen; and (b) an organosilicon group-containing monomer having a terminal functional group selected from isocyanate and active hydrogen.

Detailed Description of the Invention

Preferably, the low temperature curing compositions of the present invention broadly comprise a soft, hydrolyzable organosilicon group-containing polymer which has a cured glass transition temperature of less than 5° C. and a hard, film-forming polymer which has a cured glass transition temperature of greater than 25° C.

The aforesaid soft, organosilicon group-containing polymer preferably has a cured glass transition temperature of less than 0° C., and more preferably less than −10° C. The term "cured glass transition temperature" means the glass transition temperature (Tg) of a cured material of about 1 to 3 mils in thickness and free of solvent. The cured glass transition temperature is measured with a penetrometer such as a Model TMS-2 Perkin-Elmer Thermomechanical Analyzer (TMA) utilizing a quartz probe having a tip radius of 0.018 inches (0.46 millimeters), a load of 10 grams, and a heating rate of 10° C. per minute. The cured material (a cured material for the purpose of these measurements can be hard as well as tacky) is cured by mixing with 4 percent based on solids of dibutyltin dilaurate. The mixture is drawn down with a 3-mil drawbar on a cold rolled steel panel and baked at 250° F. (121° C.) for 45 minutes. The panel is then allowed to stand for 48 hours at 70° F. (21° C.) and a relative humidity of 50 percent. The glass transition temperature is then measured on this cured composition.

In addition to being "soft" the organosilicon group-containing polymer can be further characterized as non-gelled or ungelled. By the term "non-gelled" of ungelled is meant that the resinous material is substantially free of crosslinking and has an intrinsic viscosity when dissolved in a suitable solvent without depolymerization. The intrinsic viscosity of such a material is an indication of molecular weight. A gelled material, on the other hand, cannot be dissolved in common organic solvents and since it has an essentially infinitely high molecular weight, will have an intrinsic viscosity which is too high to measure.

The intrinsic viscosity of the organosilicon group-containing polymer described above can be determined by art recognized methods. Briefly, for example, the polymeric material is dissolved in a specified volume of a suitable solvent such as methyl ethyl ketone or toluene at a particular concentration, e.g. from 0.1 to 0.3 grams/deciliter. The solution is filtered if necessary prior to measuring the intrinsic viscosity. A viscosity reading is taken using a capillary viscometer. This procedure is repeated using successively more dilute solutions of polymer. A graph of viscosity (ordinate) versus concentration (abscissa) is prepared and extrapolated to zero concentration. The viscosity read from the graph at zero concentration is the intrinsic viscosity of the polymeric material. A detailed discussion of the general methods of determining intrinsic viscosity can be found in the art such as *Textbook of Polymer Science*, Billmeyer, second edition, Wiley-Interscience Publishers, New York, pages 84–90.

In the preferred embodiment discussed above, the hydrolyzable organosilicon group-containing polymer is a plasticizer and is formed from (a) a condensation polymer having terminal isocyanate or active hydrogen groups; and (b) an organosilicon group-containing monomer having a terminal isocyanate or active hydrogen group. Since the polymeric plasticizer should have a cured glass transition temperature of less than 5° C., correspondingly, the condensation polymer which is employed in its preparation should also have a cured glass transition temperature of less than 5° C., i.e., be a "soft" polymer. The choice of terminal groups for the condensation polymer will depend upon whether the terminal group present on the organosilicon group-containing monomer is isocyanate or active hydrogen. The terminal groups chosen for each component must be compatible; therefore, an isocyanate terminated condensation polymer will be reacted with an active hydrogen terminated organosilicon-group containing monomer whereas an active hydrogen terminated condensation polymer will be reacted with an isocyanate terminated organosilicon group-containing monomer. It should be understood that the presence of mixed groups on the condensation polymer is acceptable. That is, the condensation polymer can contain both active hydrogen and isocyanate groups so long as the resultant hydrolyzable organosilicon group-containing polymeric plasticizer is ungelled. By terminal is meant that the groups are situated at the ends of the polymer chain and thus are not pendant. A vinyl polymerized isocynate- or active hydrogen-containing acrylate polymer is exemplary of a polymer having these groups in pendant position. It should be further understood that the condensation polymer is not the same as the organosilicon group containing monomer. Preferably, the condensation polymer is silicon-free.

Suitable active hydrogen terminated condensation polymers for reaction with an isocyanate terminated organosilicon group-containing monomer include polyester polyols, polyether polyols, and polyurethane polyols which are preferred. The aforesaid polymeric materials can if desired be reacted with an excess of organic polyisocyanate (NCO/OH equivalent ratio greater than 1:1) so that the resultant polymers have terminal isocyanate groups. Accordingly, these polymers can be reacted with an active hydrgen terminated organosilicon group containing monomer.

Examples of polyether polyols are polyalkylene ether polyols which include those having the following structural formula:

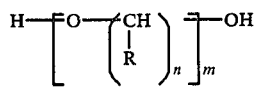

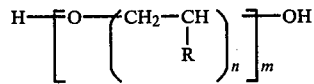

where the substituent R is hydrogen or lower alkyl containing from 1 to 5 carbon atoms including mixed substituents, and n is typically from 2 to 6 and m is from 2 to 100 or even higher. Included are poly(oxytetramethylene) glycols, poly(oxyethylene) glycols, poly(oxy-1,2-propylene) glycols and the reaction products of ethylene glycol with a mixture of 1,2-propylene oxide, ethylene oxide and alkyl glycidyl ethers.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide, in the presence of an acidic or basic catalyst.

Polyester polyols can also be used as the polyol component of the invention. Linear polyesters are more preferred than branched polyesters for use herein. Polyester polyols can be prepared by the polyesterification of an organic polycarboxylic acid or anhydride thereof with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality can also be used, although diols are preferred. Examples include trimethylolpropane, trimethylolethane, pentaerythritol and the like, as well as higher molecular weight polyols such as those produced by oxyalkylating lower molecular weight polyols. An example of such a higher molecular weight polyol is the reaction product of 20 moles of ethylene oxide per mole of trimethylolpropane. Some monofunctional alcohols such as normal propyl alcohol and normal butyl alcohol can be used in the polyesterification.

The acid component of the polyester consists primarily of monomeric carboxylic acids or anhydrides having 2 to 36 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, decanoic acid, dodecanoic acid, and other dicarboxylic acids of varying types, for example, Diels-Alder adducts of unsaturated $D_{18}$ fatty acids such as the product sold by West-Vaco Co. under the trademark DIMER ACID. The polyester may include minor amounts of monobasic acids such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsilon-caprolactone and a polyol.

In addition to the aforedescribed polyols, polyurethane polyols can also be used and these are preferred.

These polyols can be prepared by reacting any of the above-mentioned polyols with a minor amount of organic polyisocyanate (OH/NCO equivalent ratio greater than 1:1) so that terminal hydroxyl groups are present. As was stated above, isocyanate termination will result if an excess of isocyanate is utilized.

In addition to the high molecular weight polyols mentioned above, mixtures of both high molecular weight and low molecular weight polyols can be used. Among the low molecular weight polyols are diols, which are preferred, and triols such as aliphatic polyols including alkylene polyols containing from 2 to 18 carbon atoms. Examples include ethylene glycol, 1,4-butanediol, 1,6-hexanediol; cycloaliphatic polyols such as 1,2-hexanediol and cyclohexanedimethanol. Examples of triols include trimethylolpropane and trimethylolethane. Also useful are polols containing ether linkages such as diethylene glycol and triethylene glycol.

The organic polyisocyanate which is used in preparing the polyurethane polyols can also be used to react with the other aforelisted soft polymeric polyols to form the resultant isocyanate terminated polymers.

The organic polyisocyanate can be an aliphatic polyisocyanate, including a cycloaliphatic polyisocyanate of an aromatic polyisocyanate; preferably a diisocyanate is employed. Useful aliphatic diisocyanates include ethylene diisocyanate, 1,2-diisocyanatopropane, 1,3-diisocyanatopropane, 1,6-diisocyanatohexane, 1,4-butylene diisocyanate, 1,6-hexamethylene diisocyanate, lysine diisocyanate, 1,4-methylene bis(cyclohexyl isocyanate) and isophorone diisocyanate. Useful aromatic diisocyanates include the various isomers of toluene diisocyanate, meta-xylene-diisocyanate, and para-xylene-diisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition the various isomers of alpha, alpha, alpha', alpha'-tetramethyl xylene diisocyanate can be used.

The polyurethane polymers (either hydroxyl terminated or isocyanate terminated) are preferred for use in preparing the plasticizers of a preferred embodiment of the present invention because they provide an outstanding combination of hardness and flexibility. This makes them excellent for use in coatings for both elastomeric and metal substrates.

Besides the aforedescribed preferred polyols, acrylic polyols as described in U.S. Pat. No. 4,146,585 to Ward et al can also be utilized herein, said disclosure being incorporated by reference herein.

The condensation polymers of the present invention have a functionality of six or less, preferably four or less, and more preferably three or less. They have a peak molecular weight of at least 500, usually from 2,000 to 50,000, preferably from 5,000 to 50,000, more preferably from 15,000 to 50,000, and most preferred from 15,000 to 30,000. The term functionality is defined to mean $$\frac{\text{the number average molecular weight of the polymer as determined by absolute means}}{\text{equivalent weight}}.$$

The number average molecular weight for the purpose of this definition can be determined by, for example, vapor phase osmometry. This procedure is described in detail in *Testbook of Polymer Science*, Billmeyer, Second Edition, Wiley-Interscience Publishers, New York, pages 67 to 68. By this definition, a primary amine, therefore, has a functionality of one upon reaction with isocyanate.

The molecular weights are determined by gel permeation chromatography using a polystyrene standard. Therefore, it is not the actual molecular weight which is measured but an indication of the molecular weight as compared to polystyrene. The values which are obtained are commonly referred to as polystyrene numbers; however for the purposes of this application they are referred to as molecular weights. The peak molecular weights are determined by the following method.

In measuring the peak molecular weight using polystyrene as the standard, a Waters Associates gel permeation chromatograph Model 201 was used. Six micro-Styragel columns were used. Each column measured 30 centimeters in length and had an inside diameter of 7.8 millimeters. A differential refractometer was used as detector, and the columns were arranged according to their pore size on the order of $10^3$, $10^4$, $10^5$, $10^6$, 500, 100 Angstroms with the $10^3$ Angstrom column being the first one. Tetrahydrofuran was used as a solvent with a flow rate of 2.0 milliliters/minute. The quality of the columns is checked by their "theoretical plate number" determined from ortho-dichlorobenzene. For the purposes of this application, those columns with theoretical plate numbers greater than 3000/30 cm were used.

To determine molecular weight by gel permeation chromatography (GPC), the instrument is first calibrated using a polystyrene standard. Polystyrene standards used were purchased from Pressure Chemicals Company, Pittsburgh, Pennsylvania. The polystyrene standards have dispersities (dispersity=weight average molecular weight/number average molecular weight) ranging from 1.05 to 1.10. The viscosity average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.5 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 4,000 and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. The molecular weight which is reported is the peak molecular weight which is the polystyrene number in the molecular weight distribution curve at the peak. Where there is more than one peak, the highest peak is intended.

The organosilicon group-containing monomer which, preferably, is reacted with the aforedescribed condensation polymer has a molecular weight of less than 1000 and contains the following moieties:

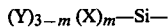

wherein X is a hydrolyzable alkoxy group containing from 1 to 4 carbon atoms, preferably 1 to 3, Y is hydrogen or an alkyl group containing from 1 to 4 carbon atoms, and m is an integer from 1 to 3. Preferably the organosilicon group-containing monomer can be represented by the following structural formula:

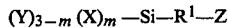

wherein X, Y and m are defined above, R is an alkylene radical having from 2 to 10 carbon atoms and Z is NCO or $NR^1H$ wherein $R^1$ is hydrogen or an alkyl group containing from 1 to 4 carbon atoms. Particularly preferred materials for use according to present invention are isocyanatpropyltriethoxysilane and aminopropyltriethoxysilane. Also, materials such as the reaction product of aminopropyltriethoxysilane with caprolactone or ethylene carbonate can be used.

The organosilicon group-containing monomers of the present invention can be prepared by art-recognized methods and they are commercially available from several sources such as Union Carbide or Dow Chemical. A detailed discussion concerning the preparation of these materials is therefore felt not to be necessary for the purposes of this application.

The reaction between the condensation polymer and the organosilicon group-containing monomer is carried out under anhydrous conditions and preferably an inert atmosphere such as a nitrogen blanket, to prevent premature hydrolysis of the alkoxysilane groups. The reaction can be suitably carried out between 0° C. and 150° C., preferably between 25° C. and 100° C., until the presence of isocyanate groups can no longer be detected by infrared analysis. A catalyst is typically utilized; such as, for example, the dialkyltin dicarboxylates such as dibutyltin dilaurate. The reaction is also generally carried out in the presence of an organic solvent which is inert to the reactants, for example, methyl isobutyl ketone, toluene, ethoxy ethanol acetate, xylene, and methyl ethyl ketone. The resultant hydrolyzable organosilicon group containing polymeric plasticizer has a silicon content of less than 4 percent, more preferably less than 2 percent. The presence of an excessively high silicon content is not preferred because of decreases in flexiblity which result.

Preferably, the hydrolyzable organosilicon group-containing polymeric plasticizer discussed above is used as modifier for a variety of art-recognized compositions which comprise a hard film-forming polymer. The term "hard" is meant to refer to polymers which have a cured glass transition temperature of greater than 25° C., preferably greater than 30° C. Acrylic polymers are excellent examples of "hard" polymers. The cured glass transition temperature of these hard polymers is determined by the same method as has been detailed above for the soft, organosilicon group-containing polymer with the exception that the hard polymer is cured in a different manner. Preferably the method utilizes a non-pigmented sample of hard polymer so as to guard against possible interference by pigment particles. Also, after baking under the conditions previously described the cured film is allowed to stand for 72 hours (rather than 48) prior to measuring the cured Tg.

The art recognized compositions described above are capable of curing at low temperatures. The term curing is meant to include not only air drying at ambient temperature to remove solvent and form a thermoplastic lacquer but also chemical crosslinking by the application of heat to form a hard, thermosetting material.

The polymeric platicizers according to a preferred embodiment of the present invention can be utilized to modify air-dried lacquer compositions which contain no curing agent as well as compositions which comprise a polymeric polyol in combination with an aliphatic polyisocyanate curing agent. The first type of composition is exemplified by an air-dried acrylic polymer lacquer sold by PPG Industries, Inc. under the trademark DURACRYL. The second type of composition is exemplified by a product sold by PPG Industries, Inc. under the trademark DELTRON. This two-package composition utilizes an acrylic polyol which is present in one package, in combination with an aliphatic polyisocyanate curing agent which is present in a second package. The two packages are mixed immediately prior to use. Related to the aforesaid DELTRON composition is a composition sold by PPG Industries, Inc. under the trademark DELTHANE. DELTHANE utilizes an acrylic polyol which is modified with a small proportion of linseed oil and used in combination with an aliphatic polyisocyanate curing agent. The linseed oil makes possible some oxidative cure in addition to that provided by the polyisocyanate. Also related is a product sold by PPG Industries, Inc. under the trademark DELSTAR. This composition is identical to DELTHANE except that there is no polyisocyanate curing agent present. Besides isocyanate curing systems, aminoplast curing systems can also be used.

The coating compositions of the present invention will usually contain from about 5 percent to 95 percent by weight of the essentially silicon-free film-forming polymer, and from about 5 percent to 95 percent by weight of the non-gelled, hydrolyzable organosilicon group-containing polymer, preferably 20 percent to 80 percent in the embodiment wherein the polymer is a plasticizer. The compositions can also contain up to 2 percent of a catalyst to help accelerate the rate of hydrolysis of the alkoxysilane groups, for example, tin salts such as dibutyltin dilaurate, the percentages being based upon the total weight of the film-forming polymer and plasticizer. The coating compositions are also typically formulated in an organic solvent and can contain optional ingredients such as fillers, pigments, ultraviolet light stabilizers, and the like.

Cure of the applied compositions is effected by moisture causing the alkoxysilane groups to hydrolyze and eventually form siloxane bonds. The lacquer compositions can be air dried without applying heat; the thermosetting compositions usually require baking however the compositions cure quite well at low temperatures thus the amount of heat required is minimal. A temperature ranging from about 20° C. to 300° C. for a period of at least ten minutes is generally sufficient.

The compositions of the present invention not only cure at a low temperature but also are both durable and flexible, have good adhesion, and bond to a variety of substrates. As a result the compositions are ideally suited for automobile refinishing, including application over elastomeric as well as metallic parts.

The following examples are merely illustrative of the invention and should not be construed as limiting the scope thereof as defined by the appended claims.

EXAMPLES

The following examples show the preparation of various silane-terminated polymers. The polymers were prepared by the following syntheses:

(1) reacting NCO-terminated polymers with amino functional silanes; and (2) reacting hydroxyl-terminated polymers with NCO-functional silanes. The various silane-terminated polymers were then blended with various acrylic polymers and formulated into refinish coating compositions which were sprayed onto elastomeric substrates, cured, and the cured coatings evaluated for flexibility and gloss.

Silane-Terminated Polymers

Examples 1-5

In these examples, isocyanatopropyltriethoxysilane was reacted with a hydroxyl-terminated poly(ester-urethane) in various ratios to form a silane terminated polymer having a cured glass transition temperature of $-31°$ C.$\pm 0.8°$. The poly(ester-urethane) was formed from reacting isophorone diisocyanate with a dipropylene adipate polyester. The silane-terminated polymers were formed the following mixtures of ingredients:

| Ingredients | Parts by Weight in grams | | | | |
|---|---|---|---|---|---|
| | Example 1 | Example 2 | Example 3 | Example 4 | Example 5 |
| Dipropylene adipate polyester[a] | 165.40 | 172.80 | 179.20 | 183.10 | 184.40 |
| Isophorone diisocyanate | 26.20 | 36.50 | 45.50 | 50.80 | 52.60 |
| Isocyanatopropyl-triethoxysilane[b] | 58.40 | 40.70 | 25.30 | 16.10 | 13.0 |
| Dibutyltin dilaurate | 1.25 | 1.25 | — | — | — |
| Methyl isobutyl ketone | 62.50 | 62.50 | — | — | — |
| Mole Ratio of: | | | | | |
| (1) Dipropylene adipate polyester | 2.0 | 3.0 | 5.0 | 8.0 | 10.0 |
| (2) Isophorone diisocyanate | 1.0 | 2.0 | 4.0 | 7.0 | 9.0 |
| (3) Isocyanatopropyl-triethoxysilane | 2.0 | 2.0 | 2.0 | 2.0 | 2.0 |

[a]Polyester having hydroxyl value of 112.5, acid value of 0.5 and number average molecular weight of about 1,000.
[b]Available from Union Carbide as Y-9030.

The ingredients in each of the Examples 1 to 5 were prepared in vented jars and placed in a 200° F. (93° C.) oven for about 5 hours until there was no evidence of NCO functionality as indicated by the infrared spectrum.

Example 6

In this example, a silane-terminated having a cured glass transition temperature of $-14.7°$ C.$\pm 1.7°$ was prepared by reacting aminopropyltriethoxysilane with an NCO-terminated poly(ester-urethane). The poly(ester-urethane) in this example was also formed from reacting isophorone diisocyanate with a dipropylene adipate polyester. The ingredients and respective proportions are listed below:

| Ingredients | Parts by Weight (grams) |
|---|---|
| Dipropylene adipate polyester[a] | 1000.0 |
| Isophorone diisocyanate | 342.4 |
| Dibutyltin dilaurate | 5.0 |
| Aminopropyltriethoxysilane[b] | 56.8 |
| Methyl ethyl ketone | 533.3 |
| Toluene | 133.3 |
| Toluene/methyl ethyl ketone (20/80 mixture) | 794.9 |
| Mole ratio of: | |
| (1) Dipropylene adipate polyester | 3.89 |
| (2) Isophorone diisocyanate | 5.99 |
| (3) Aminopropyltriethoxysilane | 1 |

[a]Polyester as described in Examples 1 to 5, above.
[b]Commercially available from Union Carbide Corporation as A-1100.

Into a two liter reactor vessel equipped with thermometer and nitrogen inlet tube were charged the polyester, isophorone diisocyanate, dibutyltin dilaurate, methyl ethyl ketone and toluene. The aforesaid mixture was heated to 85° C. for a period of two hours, (infrared spectrum evidenced the presence of NCO groups), followed by the addition of the aminopropyltriethoxysilane while under a nitrogen blanket. This mixture was heated to a temperature of 80° C. for a period of 45 minutes, (infrared spectrum evidenced absence of NCO groups), and then thinned to a resin solids content of 49 percent by the addition of the toluene/methyl ethyl ketone mixture.

PAINTS

The following paints were prepared by formulating the silane functional polymers prepared as descrbed above with various acrylic lacquers and enamels sold by PPG Industries, Inc. for the refinish market under the trademarks DURACRYL, DELTRON, DELSTAR and DELTHANE. The formulations were sprayed onto elastomeric substrates, cured at 25° C. and the cured coatings evaluated for flexibility, gloss and humidity resistance.

The DURACRYL lacquers which were utilized had a cured glass transition temperature of 84.3° C.$\pm 1.7°$.

The DELTRON enamel which was utilized had a cured glass transition temperature of 66.7° C.$\pm 1.9°$.

The DELSTAR enamels which were utilized had a cured glass transition temperature of 35° C.$\pm 2.2°$.

The DELSTAR/DELTHANE enamel which was utilized had a cured glass transition temperature of 40° C.$\pm 1.0°$.

Example I

The paint of this example was prepared by blending the silane-modified polymer of Example 1 with a silver refinish lacquer sold by PPG Industries, Inc. under the trademark DURACRYL DDL 3076 and thinning to the proper viscosity for spraying.

| Ingredients | Parts by Volume in ml. |
|---|---|
| DDL 3076 | 140 |
| DTL 876[1] | 210 |
| Silane-modified polymer of Example 1[2] | 35 |

[1] This thinner is commercially available from PPG Industries, Inc. and principally comprises a mixture of acetone, xylene, and naphtha.
[2] 100 grams of the silane-modified polymer of Example 1 (80 percent total solids) thinned with 51.2 grams of toluene and 12.0 grams of methyl ethyl ketone.

Example II

The paint of this example was prepared by blending the silane-modified polymer of Example 2 with the silver refinish lacquer set forth in Example I, above, and thinned as described in Example I.

| Ingredients | Parts by Volume in ml. |
|---|---|
| DDL 3076 | 140 |
| DTL 876 | 210 |
| Silane-modified polymer of Example 2[1] | 35 |

[1] 100 grams of the silane-modified polymer of Example 2 (80 percent total solids) thinned with 51.2 grams of toluene and 12.0 grams of methyl ethyl ketone.

Example III

The paint of this example was prepared by blending the silane-modified polymer of Example 3 with the silver refinish lacquer set forth in Example I, above, and thinning as mentioned above in connection with Example I.

| Ingredients | Parts by Volume in ml. |
|---|---|
| DDL 3076 | 140 |
| DTL 876 | 210 |
| Silane-modified polymer of Example 3[1] | 35 |

[1] 100 grams of the silane-modified polymer of Example 3 (80 percent total solids) thinned with 51.2 grams of toluene and 12.0 grams of methyl ethyl ketone.

Example IV

The paint of this example was prepared by blending the silane-modified polymer of Example 4 with the silver refinish lacquer set forth in Example I, above, and thinning as mentioned above in connection with Example I.

| Ingredients | Parts by Volume in ml. |
|---|---|
| DDL 3076 | 140 |
| DTL 876 | 210 |
| Silane-modified polymer of Example 4[1] | 35 |

[1] 100 grams of the silane-modified polymer of Example 4 (80 percent total solids) thinned with 51.2 grams of toluene and 12.0 grams of methyl ethyl ketone.

Example V

The paint of this example was prepared by blending the silane-modified polymer of Example 5 with the silver refinish lacquer set forth in Example I, above, and thinning as mentioned above in connection with Example I.

| Ingredients | Parts by Volume in ml. |
|---|---|
| DDL 3076 | 140 |
| DTL 876 | 210 |
| Silane-modified polymer of Example 5[1] | 35 |

[1] 100 grams of the silane-modified polymer of Example 5 (80 percent total solids) thinned with 51.2 grams of toluene and 12.0 grams of methyl ethyl ketone.

Example VI

The paint of this example was prepared by blending the silane-modified polymer of Example 5 with a white refinish lacquer sold under the trademark DURACRYL DDL 2058 and thinning to the proper viscosity for spraying.

| Ingredients | Parts by Volume in ml. |
|---|---|
| DDL 2058 | 140 |
| DTL 876 | 210 |
| Silane-modified polymer as used in Example V | 35 |

Example VII

The paint of this example was similar to that of Example VI with the exception that twice as much of the silane-modified polymer was used.

| Ingredients | Parts by Volume in ml. |
|---|---|
| DDL 2058 | 140 |
| DTL 876 | 210 |
| Silane-modified polymer as used in Example V | 70 |

Example VIII

The paint of this example was prepared by blending the silane-modified polymer of Example 5 with an oxidative cure silver enamel sold under the trademark DELSTAR 2593 and thinning to the proper viscosity for spraying.

| Ingredients | Parts by Volume in ml. |
|---|---|
| DAR 2593 | 160 |
| DTR 601[1] | 80 |
| Silane-modified polymer as used in Example V | 40 |

[1] Thinner commercially available from PPG Industries, Inc. comprising principally a mixture of acetone, toluene, naphtha and ethylene glycol monobutyl ether acetate.

Example IX

The paint of this example was similar to that of example VIII with the exception that twice as much of the silane-modified polymer was used.

| Ingredients | Parts by Volume in ml. |
|---|---|
| DAR 2593 | 160 |
| DTR 601 | 80 |
| Silane modified polymer as used in Example V | 80 |

Example X

The paint of this example was prepared by blending the silane-modified polymer of Example 5 with a white oxidatively cured refinish enamel sold under the trademark DELSTAR 2058 and thinning to the proper viscosity for spraying.

| Ingredients | Parts by Volume in ml. |
|---|---|
| DAR 2058 | 160 |
| DTR 601 | 80 |
| Silane-modified polymer as used in Example V | 40 |

Example XI

The paint of this example was similar to that of Example XII with the exception that twice as much of the silane-modified polymer was used.

| Ingredients | Parts by Volume in ml. |
|---|---|
| DAR 2058 | 160 |
| DTR 601 | 80 |
| Silane-modified polymer as used in Example V | 80 |

Example XII

The paint of this example was prepared by blending the silane-modified polymer of Example 5 with a silver refinish enamel sold under the trademark DELSTAR 2593/DELTHANE. The DELSTAR/DELTHANE system comprised an acrylic lacquer in which the acrylic polymer contained unsaturation capable of oxidative cure in combination with a polyisocyanate. The materials come in the form of a two-package system with the acrylic lacquer and pigment being presnet in one package and the polyisocyanate in the second package. The packages, along with the silane-modified polymer, are blended immediately before use and thinned to the proper viscosity for spraying

| Ingredients | Parts by Volume in ml. |
|---|---|
| DAR 2593 (acrylic lacquer and pigment package) | 160 |
| DTR 601 | 80 |
| Silane-modified polymer as used in Example V | 40 |
| DXR 80[1] (polyisocyanate package) | 20 |

[1]DXR 80 is commercially available from PPG Industries, Inc. and is a 90% resin solids solution of a polyisocyanate in 2-ethoxyethylacetate.

Example XIII

The paint of this example was similar to that of Example XII with the exception that twice as much of the silane-modified polymer was used.

| Ingredients | Parts by Volume in ml. |
|---|---|
| DAR 2593 | 160 |
| DTR 601 | 80 |
| Silane-modified polymer as used in Example V | 80 |
| DXR 80 | 20 |

Example XIV

The paint of this example was prepared by blending the silane-modified polymer of Example 5 with a silver refinish enamel sold under the trademark DELTRON 2593. The DELTRON refinish composition was based on an acrylic polyol and a polyisocyanate. The acrylic polyol and the pigment are in one package, and the polyisocyanate is in a second package. The two packages, along with the silane-modified polymer, are blended immediately before use and thinned to the proper viscosity for spraying.

| Ingredients | Parts by Volume in ml. |
|---|---|
| DAU 2593 (acrylic polyol and pigment package) | 100 |
| DTU 503[1] | 100 |
| Silane-modified polymer as used in Example V | 50 |
| DAU 2[2] | 50 |

[1]Thinner commercially available from PPG Industries, Inc. comprising a mixture principally of naphtha, aromatic hydrocarbon, 2-butoxyethylacetate and acetone.
[2]DAU 2 is commercially available from PPG Industries, Inc. and is a 60% resin solid solution of a NCO-prepolymer in 2-ethoxyethanol and xylene.

Example XV

The paint of this example of this example was similar to that of Example XIV with the exception that twice as much of the silane-modified polymer was used.

| Ingredients | Parts by Volume in ml. |
|---|---|
| DAU 2593 | 100 |
| DTU 503 | 100 |
| Silane-modified polymer as used in Example V | 100 |
| DAU 2 | 50 |

Example XVI

In this example the silane-modified polymer of Example 6, above, was formulated with an acrylic refinish lacquer sold under the trademark DURACRYL DDL 3310. The paint was prepared by blending the silane-terminated polymer prepared above in Example 6 and thinning to the proper viscosity for spraying

| Ingredients | Parts by Volume in Milliliters |
|---|---|
| DDL 3310 | 140 |
| DTL 876 | 210 |
| Silane modified polymer of Example 6[1] | 35 |

[1]100 grams of the silane-modified polymer of Example 6, above, (80 percent total solids) thinned with 51.2 grams of toluene and 12.0 grams of methyl ethyl ketone.

The paints of Examples I through VII and XVI were sprayed onto elastomeric polyurethane substrates commercially available from Mobay Company as TEXIN. The paints of Examples VIII through XV were sprayed over primed elastomeric substrates commercially available from Davidson Rubber Company as MC-1073. The coatings were cured at 25° C. Film thickness was about 1.5 to 2 mils. After curing, the coated substrates were evaluated for flexibility, glass and humidity resistance. The results were reported in the Table below.

TABLE

Properties of Cured Coatings of Examples I–XVI

| Example No. | Flexibility[1] 48 hours | Flexibility[1] 1 week | 20° Gloss[2] 48 hours | 20° Gloss[2] 1 week | Humidity Resistance[3] Flexibility | Humidity Resistance[3] 20° Gloss |
|---|---|---|---|---|---|---|
| I | Pass (10) | Pass (10) | 29 | 27 | Fail | 7 |
| II | " | " | 32 | 20 | Pass (3) | 15 |
| III | " | " | 30 | 23 | " | 20 |
| IV | " | " | 26 | 21 | Pass (6) | 22 |
| V | " | " | 26 | 20 | Pass (8) | 23 |
| VI | " | " | 21 | 19 | Fail | 12 |
| VII | " | " | 44 | 36 | Pass (10) | 28 |
| VIII | Pass (3) | Pass (3) | 29 | 28 | Pass (3) | 6 |
| IX | " | " | 34 | 36 | " | 3 |
| X | " | " | 57 | 59 | " | 2 |
| XI | " | " | 53 | 55 | " | 1 |
| XII | " | " | 68 | 67 | " | 56 |
| XIII | " | " | 64 | 65 | " | 46 |
| XIV | " | " | 60 | 62 | Pass (1) | 51 |
| XV | " | " | 56 | 58 | Pass (3) | 53 |
| XIV | " | " | 60 | 62 | Pass (1) | 51 |
| XV | " | " | 56 | 58 | Pass (3) | 53 |
| XVI | Pass (10) | Pass (10) | 19 | 16 | Fail | 14 |

[1]The flexibility was determined by bending the coated substrate 180° and observing for cracks. A pass rating meant that the coating could be bent once with no cracking. The number in parenthesis indicates the number of times the coated substrate could be bent without any evidence of cracking. Ten was the upper limit of the test. Flexibility testing was done 48 hours after curing and one week after curing.

[2]The 20° gloss was measured with a Gardner gloss meter and measurements were taken 48 hours after curing and one week after curing.

[3]Humidity resistance was obtained by taking the freshly cured coating and exposing it to 100 percent relative humidity for 4 days at 100° F. (38° C.) and measuring the flexibility and the 20° gloss as described above.

What is claimed is:

1. An improved low temperature curing composition, comprising an essentially silicon-free polymer and a silicon group-containing material, characterized in that the silicon group-containing material is a hydrolyzable, non-gelled organosilicon group-containing polymer formed from reacting:
   (a) an essentially silicon-free polymer having functional groups which are selected from isocyanate and active hydrogen; and
   (b) an organosilicon group-containing material having functional groups reactive with the isocyanate and active hydrogen.

2. The curable composition of claim 1 wherein the essentially silicon-free polymer is a hard, film-forming having a cured glass transition temperature of greater than 25° C.

3. The curable composition of claim 2 wherein the hydrolyzable, non-gelled organosilicon group-containing polymer has a cured glass transition temperature of less than 5° C.

4. The curable composition of claim 1 wherein the essentially silicon free polymer of (a) is a condensation polymer.

5. The curable composition of claim 1 wherein the organosilicon group-containing material is an organosilicon group-containing monomer.

6. An improved low temperature curing composition, comprising a hard film-forming polymer which has a cured glass transition temperature of greater than 25° C. and a plasticizer, characterized in that the plasticizer is a hydrolyzable organosilicon group-containing polymer which has a cured glass transition temperature of less than 5° C.; said hydrolyzable organosilicon group-containing polymer being non-gelled and formed from
   (a) a condensation polymer having terminal functional groups which are selected from isocyanate and active hydrogen; and
   (b) an organosilicon group-containing monomer having a terminal functional group selected from isocyanate and active hydrogen.

7. The composition of claim 6 wherein the condensation polymer has a functionality of 6 or less.

8. The composition of claim 7 wherein the condensation polymer has a functionality of 4 or less.

9. The composition of claim 8 wherein the condensation polymer has a functionality of 3 or less.

10. The composition of claim 6 wherein the condensation polymer has a peak molecular weight of at least 500.

11. The composition of claim 10 wherein the peak molecular weight is within the range of from 2000 to 50,000.

12. The composition of claim 11 wherein the peak molecular weight is within the range of from 5000 to 50,000.

13. The composition of claim 12 wherein the peak molecular weight is within the range of from 15,000 to 50,000.

14. The composition of claim 13 wherein the peak molecular weight is within the range of from 15,000 to 30,000.

15. The composition of claim 6 wherein the condensation polymer is a polyurethane.

16. THe composition of claim 6 wherein the condesation polymer contains terminal active hydrogen groups.

17. The composition of claim 6 wherein the organosilicon group-containing monomer has from 1 to 3 hydrolyzable alkoxy groups bonded to silicon.

18. The composition of claim 6 wherein the organosilicon group-containing monomer has the following moieties: $-Si-(X)_m(Y)_{3-m}$ wherein X is a hydrolyzable alkoxy group containing from 1 to 4 carbon atoms, Y is hydrogen or alkyl containing from 1 to 4 carbon atoms, and m is an integer of from 1 to 3.

19. The composition of claim 6 wherein the organosilicon group-containing monomer has a terminal isocyanate group.

20. The composition of claim 6 wherein the organosilicon group-containing monomer has a terminal primary amine group.

21. The composition of claim 19 wherein the organosilicon group-containing monomer is isocyanatopropyltriethoxysilane.

22. The composition of claim 20 wherein the organosilicon group-containing monomer is aminopropyltirethoxysilane.

* * * * *